United States Patent
Kurosaka et al.

(10) Patent No.: US 6,414,819 B1
(45) Date of Patent: Jul. 2, 2002

(54) FLOPPY DISK CARTRIDGE WITH CONCAVE PORTIONS FORMED IN AN UPPER OR LOWER SHELL

(75) Inventors: Toshinori Kurosaka; Tamotsu Shibata, both of Yamagata; Shigenori Inamoto; Tsuneo Uwabo, both of Kanagawa, all of (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/481,934

(22) Filed: Jan. 13, 2000

(51) Int. Cl.[7] .............................................. G11B 23/03
(52) U.S. Cl. ....................................................... 360/133
(58) Field of Search ............................... 360/133, 132; 369/287, 291, 275.5

(56) References Cited

U.S. PATENT DOCUMENTS

| | | | |
|---|---|---|---|
| 4,296,448 A | * 10/1981 | Garcia, Jr. et al. | 360/135 |
| 4,885,652 A | * 12/1989 | Leonard et al. | 360/133 |
| 4,911,301 A | * 3/1990 | Dieffenbach | 206/444 |
| 5,043,974 A | * 8/1991 | Nakagawa et al. | 369/291 |
| 5,701,225 A | * 12/1997 | Okmura et al. | 360/132 |
| 5,710,687 A | * 1/1998 | Drebenstedt | 360/133 |
| 6,130,806 A | * 10/2000 | Uwabo et al. | 360/133 |

FOREIGN PATENT DOCUMENTS

| | | | |
|---|---|---|---|
| JP | 7-176160 | * | 7/1995 |
| JP | 8-45225 | * | 2/1996 |
| JP | 11-328908 | * | 11/1999 |

* cited by examiner

Primary Examiner—Jefferson Evans
(74) Attorney, Agent, or Firm—Whitham, Curtis & Christofferson, P.C.

(57) ABSTRACT

A floppy disk cartridge 1 includes an upper shell 3a and a lower shell 3b, a magnetic disk 4 rotatably incorporated between the upper shell 3a and the lower shell 3b, head windows 2, 2 provided at respective one sides of the upper shell 3a and the lower shell 3b so as to face with each other, and liners 7a, 7a respectively attached to inner faces of the upper shell 3a and the lower shell 3b except the head windows 2, 2 for protecting the magnetic disk 4, characterized in that at the inner face of either one of the upper shell 3a and the lower shell 3b are formed concave portions 8, 8 along both left and right side edges of the head window 2, and that the liner 7a is attached to the inner face of the upper shell 3a or the lower shell 3b from respective outer edges of the concave portions 8, 8.

5 Claims, 4 Drawing Sheets

FLOPPY DISK CARTRIDGE WITH CONCAVE PORTIONS FORMED IN AN UPPER OR LOWER SHELL

BACKGROUND OF INVENTION

1. Field of Invention

This invention relates to a floppy disk cartridge, and more particularly to the floppy disk cartridge wherein a waving phenomenon which occurs at high speed rotation of a magnetic disk rotatably incorporated in the floppy disk cartridge can be absorbed, thereby allowing a smooth rotation of the magnetic disk.

2. Related Art

A conventional floppy disk cartridge of the type will be described referring to FIGS. 5 and 6. FIG. 5 is a front view of the floppy disk cartridge 1 (hereinafter referred to as "FD cartridge") taken in a vertical section traversing a position of a head window 2, and FIG. 6 is a rear view showing an inner face of a lower shell 3b. In FIG. 5, the FD cartridge 1 consists of an upper shell 3a and the lower shell 3b attached to each other, and a magnetic disk 4 rotatably incorporated between the upper and lower shells. The magnetic disk 4 is incorporated in the FD cartridge 1 with its center hub 5 inserted in a hub opening 6 which is formed in the central part of the lower shell 3b.

Liners 7, 7 formed of a soft cloth-like sheet are respectively attached to the inner face of the upper shell 3a except the head window 2 and the area facing with the hub opening 6, and to the inner face of the lower shell 3b except the head window 2 and the hub opening 6. The liners 7, 7 are provided for the purpose of protecting respective media faces on both upper and lower faces of the magnetic disk 4 so as to keep the media faces free from scratches or the like.

When the magnetic disk rotatably incorporated inside the conventional FD cartridge performs a high speed rotation, gaps between the magnetic disk and the upper shell and the lower shell abruptly change by the head window part to cause a waving rotation of the magnetic disk. On such occasion, there would be a fear that the magnetic head might not stably contact or float with respect to the magnetic disk which is rotating at high speed, and would not be able to obtain accurate reading and writing on the magnetic disk.

SUMMARY OF INVENTION

Accordingly, there has arisen a technical problem which should be solved to attain a smooth rotation of the magnetic disk by preventing an occurrence of the waving phenomenon even when the magnetic disk in the FD cartridge rotates at high speed, and it is an object of the invention to solve the problem.

This invention is proposed to attain the above described object, and to provide a floppy disk cartridge which comprises an upper shell and a lower shell, a magnetic disk rotatably incorporated between the upper shell and the lower shell, head windows provided at respective one sides of the upper shell and the lower shell so as to face with each other, and liners respectively attached to inner faces of the upper shell and the lower shell except the head windows for protecting the magnetic disk, provided in that at the inner face of either one of the upper shell and the lower shell are formed concave portions along both left and right side edges of the head window, and that the liner is attached to the inner face of the upper shell or the lower shell from respective outer edges of the concave portions.

According to the invention, there are formed concave portions at both sides of the head window at the inner face of either of the upper shell and the lower shell of the FD cartridge. Therefore, when the FD cartridge is inserted into the floppy disk drive and the magnetic disk in the FD cartridge is rotated at high speed, the negative pressure will be created in the concave portions with the high speed rotation of the magnetic disk. Then, the magnetic disk which is rotating at high speed will be drawn toward the concave portions by the negative pressure. Thus, such waving rotation as occurring in the conventional floppy disk cartridge will be inhibited and the smooth high speed rotation of the magnetic disk can be anticipated. In this way, the invention can attain significant effects that stable contact or floating of the magnetic head with respect to the magnetic disk can be obtained thereby to perform accurate reading and writing.

DETAILED DESCRIPTION OF PREFERRED EMBODIMENTS

Figure 1:
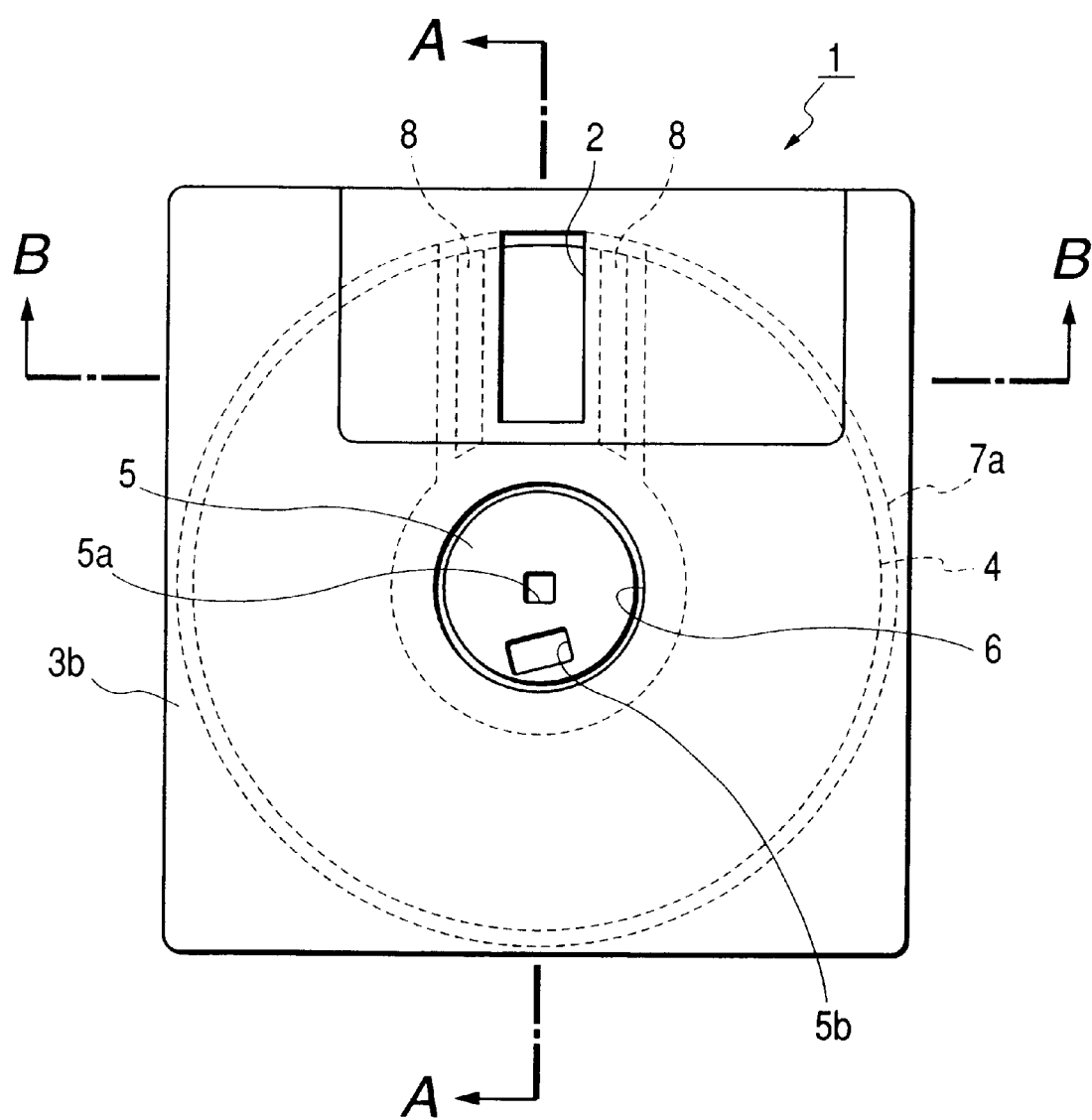
FIG. 1 is a back view of an FD cartridge showing one embodiment of the invention.
Figure 2A:
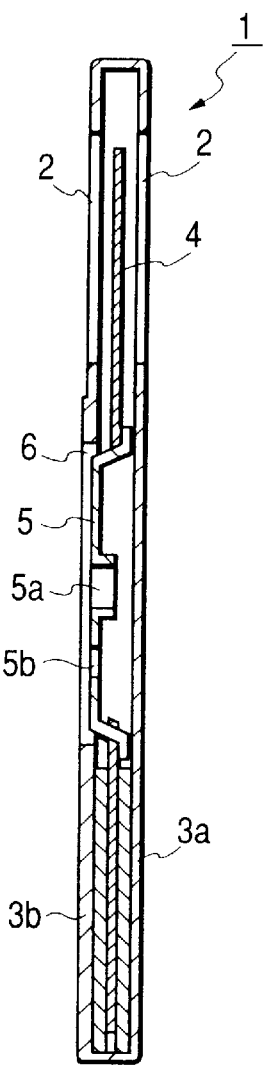
FIG. 2(a) is a sectional view taken along a line A—A in FIG. 1.
Figure 2B:
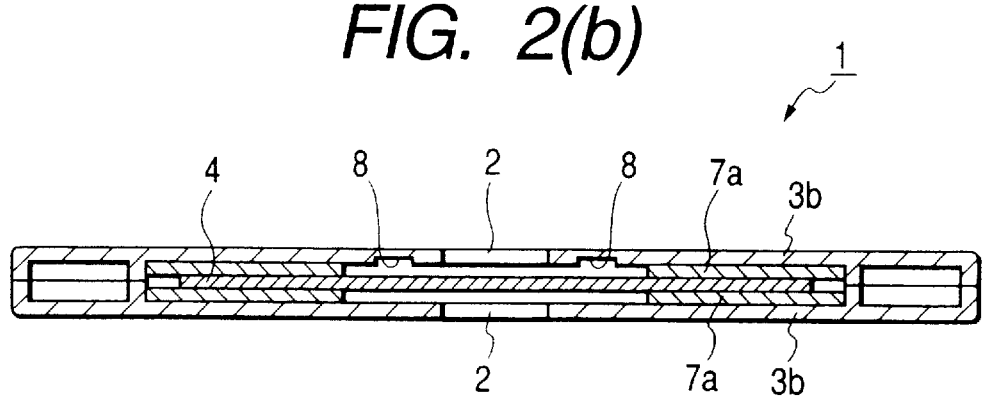
FIG. 2(b) is a sectional view taken along a line B—B in FIG. 1.

Now, one embodiment according to the invention will be described referring to FIGS. 1 to 4. For the sake of an explanatory convenience, constituent elements which belong to the prior art will be described with the same reference numerals. FIG. 1 is a back view of the FD cartridge, FIG. 2(a) is a sectional view taken along a line A—A in FIG. 1, and FIG. 2(b) is a sectional view taken along a line B—B in FIG. 1. In the drawings, the FD cartridge 1 externally covers the upper face and the lower face of the magnetic disk 4. The magnetic disk 4 is formed of a disc of a plastic resin having flexibility, and media faces for reading and writing are formed on both faces of the magnetic disk by uniformly applying or evaporating magnetic powder to the faces.

Figure 3:
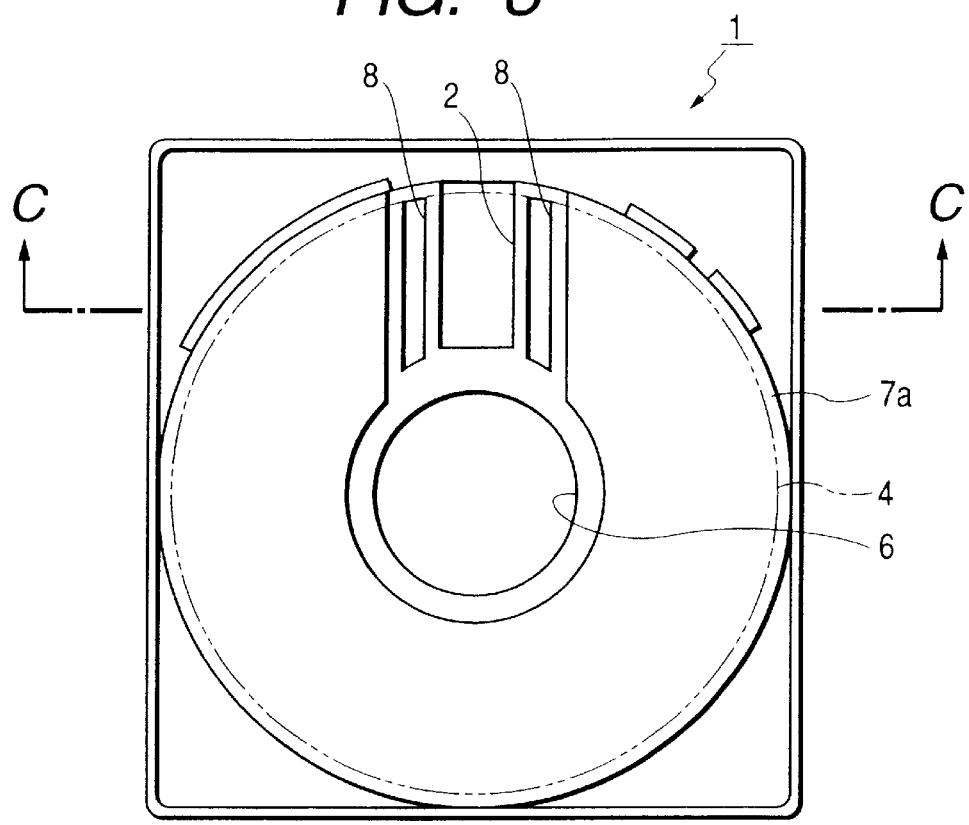
FIG. 3 is a rear view of a lower shell of the FD cartridge.
Figure 4A:
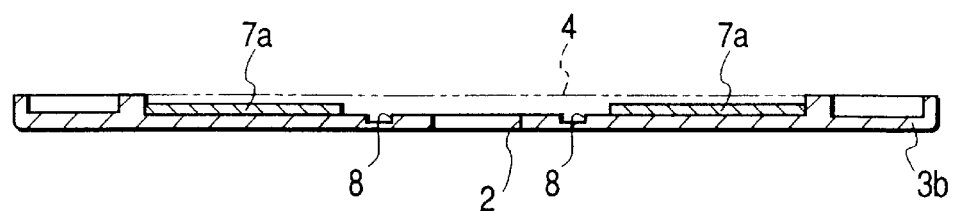
FIG. 4(a) is a sectional view taken along a line C—C in FIG. 3.
Figure 4B:
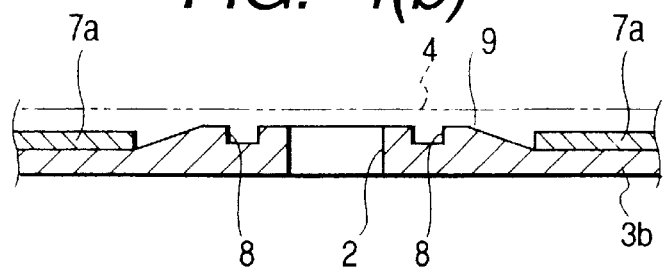
FIG. 4(b) is a partly cut away front view taken in a vertical section traversing a face of a head window showing another embodiment of the invention.
Figure 5:
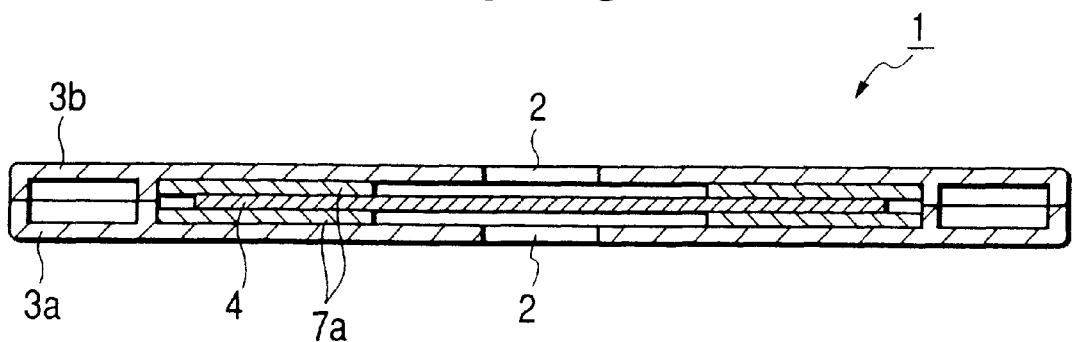
FIG. 5 is a sectional view taken along a line D—D in FIG. 6 showing a conventional FD cartridge.
Figure 6:
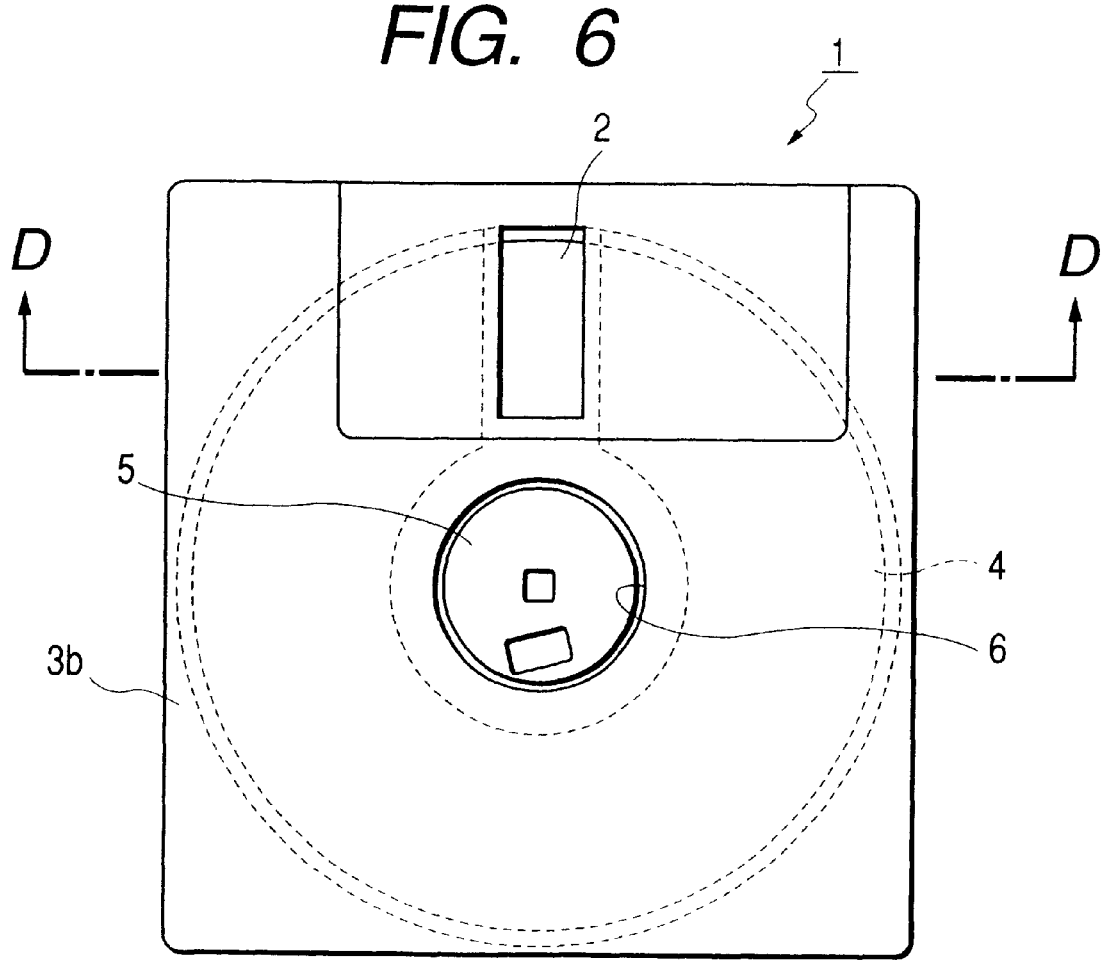
FIG. 6 is a rear view of the conventional FD cartridge.

To the center of the magnetic disk 4 is fixed a center hub 5. The center hub 5 is formed with a spindle hole 5a at its central portion, and a drive hole 5b is formed at a determined position near an outer circumferential edge of the center hub 5 for receiving a drive pin (not shown) of a disk table. Further, the lower shell 3b is formed with a hub opening 6 at the central part thereof. Head windows 2, 2 are formed close to the hub opening 6 respectively in the upper shell 3a and the lower shell 3b in a forward direction of the upper and lower shells so as to face with each other. As shown in FIGS. 3 and 4, concave portions 8, 8 are formed in either of the upper shell 3a and the lower shell 3b at both sides of the head windows 2, 2 along both side edges of the head windows 2, 2.

Each of the concave portions 8, 8 is formed in a shape of an elongated groove in this embodiment and may have a length corresponding to a radial width of the magnetic disk 4 at the both faces thereof. Moreover, in order to minimize gaps between the magnetic disk 4 and areas including the concave portions 8, 8 which are formed in the upper shell 3a or the lower shell 3b, swelled parts 9, 9 may be formed at the areas including the concave portions 8, 8 so that the concave portions 8, 8 can be formed on the swelled parts 9, 9. To the inner face of either one of the upper shell 3a and the lower shell 3b which has the concave portions 8, 8, is attached a liner 7a except the head window 2, the hub opening 6 or the area corresponding to the hub opening 6 and the concave portions 8, 8 in such a manner that edges of the liner 7a are in line with the outer edges of the concave portions 8, 8. On the other hand, to the inner face of the upper shell 3a or the lower shell 3b which is not provided with the concave portions 8, 8 is attached a liner 7a except the head window 2 and the hub opening 6 or the area corresponding to the hub opening 6 in the same manner as in the conventional FD cartridge. The liners 7a, 7a are formed of a soft cloth-like sheet having flexibility, and are provided for the purpose of protecting respective media faces on both the upper and lower faces of the magnetic disk 4 to keep the media faces free from scratches or the like.

When the FD cartridge 1 according to the above described embodiment of the invention is inserted into a floppy disk drive to perform reading and writing operations at high speed rotation, a negative pressure will be created with the high speed rotation of the magnetic disk in the concave portions 8, 8 which are provided adjacent to the head windows 2, 2. As the magnetic disk 4 passes along a face of the head window 2 while it rotates at high speed, the magnetic disk 4 which is rotating at high speed will be drawn toward the concave portions 8, 8 by the negative pressure created in the concave portions 8, 8 which are provided at both left and right sides of the head window 2.

Generally, in case where the concave portions 8, 8 are not provided, the gap between the magnetic disk 4 which is rotating at high speed and either of the upper shell 3a and the lower shell 3b abruptly changes at the face of the head window 2, and the magnetic disk 4 begins to wavingly rotate at high speed. However, by providing the concave portions 8, 8, this waving phenomenon can be eliminated and a smooth high speed rotation of the magnetic disk 4 can be anticipated. Further, the negative pressure created in the concave portions 8, 8 serves to clean the mediafaces of the magnetic disk 4 by attracting dust adhered to the mediafaces into the concave portions 8, 8. Moreover, the swelled parts 9, 9 formed to provide the concave portions 8, 8 thereon facilitate the smooth high speed rotation of the magnetic disk 4.

It is a matter of course that various modifications can be made according to the invention unless they deviate from the spirit of the invention, and that the invention also includes the modifications.

As described in detail with reference to the above embodiment, according to the invention, there are formed concave portions at both sides of the head window at the inner face of either of the upper shell and the lower shell of the FD cartridge. Therefore, when the FD cartridge is inserted into the floppy disk drive and the magnetic disk in the FD cartridge is rotated at high speed, the negative pressure will be created in the concave portions with the high speed rotation of the magnetic disk. Then, the magnetic disk which is rotating at high speed will be drawn toward the concave portions by the negative pressure. Thus, such waving rotation as occurring in the conventional floppy disk cartridge will be inhibited and the smooth high speed rotation of the magnetic disk can be anticipated. In this way, the invention can attain significant effects that stable contact or floating of the magnetic head with respect to the magnetic disk can be obtained thereby to perform accurate reading and writing.

What is claimed is:

1. A floppy disk cartridge comprising:

an upper shell and a lower shell;

a magnetic disk rotatably incorporated between said upper shell and said lower shell;

head windows provided at a respective one sides of said upper shell and said lower shell so as to face with each other;

liners, respectively attached to inner faces of said upper shell and said lower shell except said head windows, for protecting said magnetic disk, and negative pressure generating concave portions formed in the inner face of one of said upper shell and said lower shell along both left and right side edges of said head window.

2. A floppy disk carriage as claimed in claim 1, wherein said liner is attached to one of the inner face of said upper shell and said lower shell from respective outer edges of said concave portions.

3. A floppy disk carriage as claimed in claim 1, wherein each of said concave portions are formed in a shape of an elongated groove.

4. A floppy disk carriage as claimed in claim 3, wherein each of said elongated groove has a length corresponding to a radial width of said magnetic disk.

5. A floppy disk carriage as claimed in claim 1, wherein each of said concave portions are formed are on swelled parts of one of said upper shell and said lower shell.

* * * * *